United States Patent
Abdul Jabbar et al.

(10) Patent No.: US 11,322,747 B2
(45) Date of Patent: May 3, 2022

(54) SOLID-STATE LITHIUM BATTERIES INCORPORATING GLASS FIBERS

(71) Applicant: Nissan North America, Inc., Franklin, TN (US)

(72) Inventors: Mohammed Hussain Abdul Jabbar, Farmington Hills, MI (US); Kulwinder Dhindsa, Westland, MI (US)

(73) Assignee: Nissan North America, Inc., Franklin, TN (US)

( * ) Notice: Subject to any disclaimer, the term of this patent is extended or adjusted under 35 U.S.C. 154(b) by 219 days.

(21) Appl. No.: 16/842,126

(22) Filed: Apr. 7, 2020

(65) Prior Publication Data
US 2021/0313586 A1 Oct. 7, 2021

(51) Int. Cl.
| | |
|---|---|
| *H01M 4/66* | (2006.01) |
| *H01M 10/052* | (2010.01) |
| *H01M 10/0585* | (2010.01) |
| *H01M 4/38* | (2006.01) |
| *H01M 4/40* | (2006.01) |
| *H01M 4/505* | (2010.01) |
| *H01M 4/525* | (2010.01) |
| *H01M 4/70* | (2006.01) |
| *H01M 4/02* | (2006.01) |

(52) U.S. Cl.
CPC ........... *H01M 4/664* (2013.01); *H01M 4/382* (2013.01); *H01M 4/405* (2013.01); *H01M 4/505* (2013.01); *H01M 4/525* (2013.01); *H01M 4/70* (2013.01); *H01M 10/052* (2013.01); *H01M 10/0585* (2013.01); *H01M 2004/021* (2013.01); *H01M 2300/0094* (2013.01)

(58) Field of Classification Search
CPC .......................... H01M 4/664; H01M 4/70–78
See application file for complete search history.

(56) References Cited

U.S. PATENT DOCUMENTS

| | | |
|---|---|---|
| 6,326,105 B1 | 12/2001 | Kejha et al. |
| 6,689,176 B2 | 2/2004 | Jen et al. |
| 9,269,947 B2 | 2/2016 | Nandi et al. |
| 2010/0273051 A1* | 10/2010 | Choi ....................... H01G 11/46 429/213 |
| 2013/0059173 A1* | 3/2013 | Hucker ............. H01M 10/0585 429/9 |
| 2019/0393541 A1 | 12/2019 | Jang |

FOREIGN PATENT DOCUMENTS

WO 2017112804 A1 6/2017

* cited by examiner

*Primary Examiner* — Stephan J Essex
(74) *Attorney, Agent, or Firm* — Young Basile Hanlon & MacFarlane, P.C.

(57) ABSTRACT

A solid-state battery cell includes a cathode comprising a cathode glass fiber scaffold impregnated with cathode active material, an anode comprising an anode glass fiber scaffold impregnated with lithium metal or a lithium metal alloy, and a first electrolyte layer comprising an electrolyte glass fiber scaffold impregnated with a first solid-state electrolyte, the electrolyte layer positioned between the cathode and the anode and the electrolyte glass fiber scaffold extending throughout the first electrolyte layer.

18 Claims, 3 Drawing Sheets

SOLID-STATE LITHIUM BATTERIES INCORPORATING GLASS FIBERS

TECHNICAL FIELD

This disclosure relates to solid-state lithium batteries incorporating glass fibers into the electrolyte and electrodes.

BACKGROUND

Lithium metal solid-state batteries have a higher energy density than conventional lithium ion batteries. However, non-uniform electrodeposition of lithium, which results in dendrites, is holding back the widespread adoption of lithium metal batteries. During battery operation, lithium is continuously deposited and removed. As the lithium is deposited, it may not deposit uniformly, forming dendrites, which are tiny, rigid branch-like structures and needle-like projections. The formation of dendrites results in a non-uniform lithium surface which further exasperates non-uniform lithium deposition. As the dendrites grow from this non-uniform deposition, battery deterioration can occur as the lithium dendrites reach the other electrode, short circuiting the battery.

SUMMARY

Disclosed herein are implementations of a solid-state battery cell and batteries having multiple solid-state battery cells. One implementation of a solid-state battery cell as disclosed herein includes a cathode comprising a cathode glass fiber scaffold impregnated with cathode active material, an anode comprising an anode glass fiber scaffold impregnated with lithium metal or a lithium metal alloy, and a first electrolyte layer comprising an electrolyte glass fiber scaffold impregnated with a first solid-state electrolyte, the electrolyte layer positioned between the cathode and the anode and the electrolyte glass fiber scaffold extending throughout the first electrolyte layer.

Another implementation of a solid-state battery cell as disclosed herein comprises a cathode comprising a cathode glass fiber scaffold is formed from individual columns of glass fiber extending in a thickness direction of the cathode, the individual columns impregnated with cathode active material and space between individual columns filled with the cathode active material, and an anode comprising an anode glass fiber scaffold formed from individual columns of glass fiber extending in a thickness direction of the anode, the individual columns impregnated with lithium metal or a lithium metal alloy and space between individual columns filled with the lithium metal or the lithium metal alloy. A first electrolyte layer comprises an electrolyte glass fiber scaffold impregnated with a first solid-state electrolyte, the electrolyte layer positioned between the cathode and the anode and the electrolyte glass fiber scaffold extending throughout the first electrolyte layer.

Another embodiment of a solid-state battery cell includes a cathode comprising a cathode glass fiber scaffold impregnated with cathode active material, an anode comprising an anode glass fiber scaffold impregnated with lithium metal or a lithium metal alloy, a first electrolyte layer comprising an electrolyte glass fiber scaffold impregnated with a first solid-state electrolyte, the electrolyte layer positioned between the cathode and the anode and the electrolyte glass fiber scaffold extending throughout the first electrolyte layer, a second electrolyte layer formed between the first electrolyte layer and the anode, the second electrolyte layer consisting of a second solid-state electrolyte, and a third electrolyte layer formed between the first electrolyte layer and the cathode, the third electrolyte layer consisting of the second solid-state electrolyte.

Other implementations and aspects are described herein and otherwise contemplated.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Lithium metal batteries have a higher energy density than conventional lithium ion batteries. During battery operation, lithium is continuously deposited and removed. However, as the lithium is deposited, it may not deposit uniformly, forming dendrites. The formation of dendrites results in a non-uniform lithium surface which further exasperates non-uniform lithium deposition. As the dendrites grow from this non-uniform deposition, battery deterioration can occur as the lithium dendrites reach the other electrode, short circuiting the battery.

Attempts to reduce dendrite formation include providing a host current collector for lithium to deposit. However, to date, host current collector designs have not been able to fully restrict the growth of lithium dendrites within the host, continuing to lead to short circuiting and battery deterioration. In addition, to date, host current collector designs have not been scalable.

Disclosed herein are solid-state battery cells with glass fibers as a framework to support the electrode material and the electrolyte, making a mechanically robust cell. The glass fibers are chemically and electrochemically stable in the anode active material, cathode active material and electrolyte material. The glass fiber framework results in layers that have improved interfacial contact and lower cell resistance. The glass fiber framework reduces or prevents dendrite growth as metallic lithium and lithium-based compounds are stable in glass.

Figure 1:
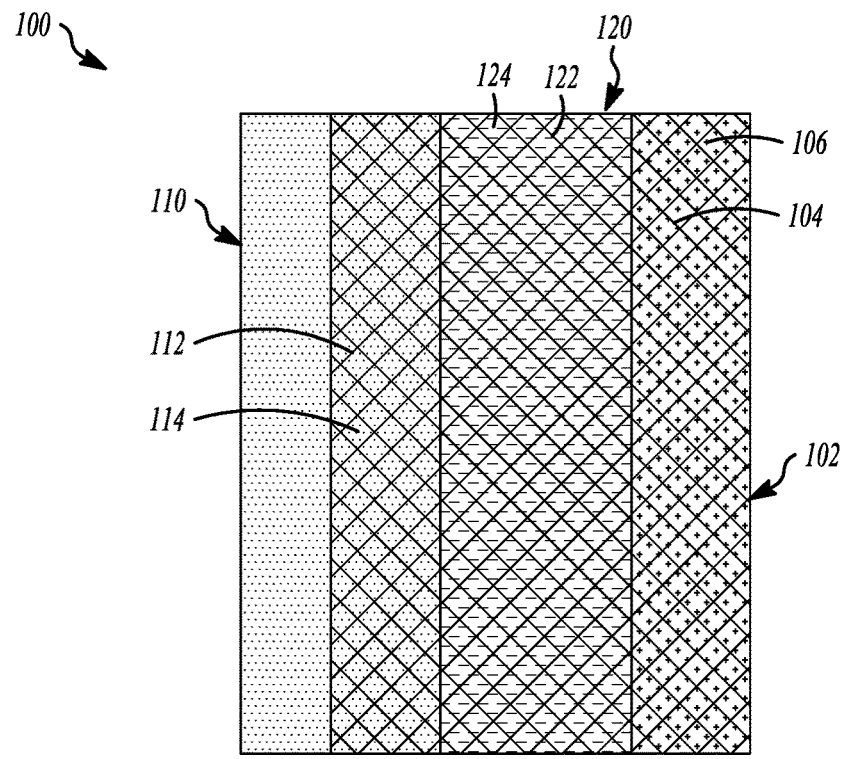
FIG. 1 is a cross-sectional view of an embodiment of a solid-state battery cell as disclosed herein.

FIG. 1 illustrates a solid-state battery cell 100 as disclosed herein. The solid-state battery cell 100 includes a cathode 102 comprising a cathode glass fiber scaffold 104 impregnated with cathode active material 106 and an anode 110 comprising an anode glass fiber scaffold 112 impregnated with anode active material 114 comprising lithium metal or a lithium metal alloy. A first electrolyte layer 120 comprises an electrolyte glass fiber scaffold 122 impregnated with a first solid-state electrolyte 124, the electrolyte layer 120 positioned between the cathode 102 and the anode 110. The electrolyte glass fiber scaffold 122 extends throughout the first electrolyte layer 120.

The electrolyte glass fiber scaffold 122, the cathode glass fiber scaffold 104 and the anode glass fiber scaffold 112 are formed of glass fibers, such as woven glass fibers. In the figures, the glass fibers are depicted with the cross-hatching. Glass fiber is a material consisting of numerous fine fibers of glass. The glass fibers can be woven into mats and grids or can be non-woven mats. The glass fiber scaffolds can be made from glass fibers in any form known to those skilled in the art, such as woven mats, non-woven mats, and open weave grids. Each of the electrolyte glass fiber scaffold 122, the cathode glass fiber scaffold 104 and the anode glass fiber scaffold 112 has a porosity of between 50% and 70%.

As illustrated in FIG. 1, each of the electrolyte glass fiber scaffold 122, the cathode glass fiber scaffold 104 and the anode glass fiber scaffold 112 can extend throughout the respective electrolyte layer 120, cathode 102 and anode 110. The glass fibers in each of electrolyte glass fiber scaffold 122, the cathode glass fiber scaffold 104 and the anode glass fiber scaffold 112 are stable in the electrode and electrolyte materials and reduce dendrite growth in the anode. The electrolyte glass fiber scaffold 122, the cathode glass fiber scaffold 104 and the anode glass fiber scaffold 112 provide a framework to support respective materials, providing mechanical strength to the cell will being easy to scale.

The first electrolyte layer 120 is formed by impregnating the electrolyte glass fiber scaffold 122 with a first solid-state electrolyte 124. The first solid-state electrolyte 124 is a solid material that enables the conduction of lithium ions. Such materials may be electrically insulating or ionic conducting. Examples of materials that can be employed as the solid-state electrolyte 102 include, but are not limited to, sulfide compounds (e.g. Argyrodite, LGPS, LPS, etc.), garnet structure oxides (e.g. LLZO with various dopants), NASICON-type phosphate glass ceramics (LAGP), oxynitrides (e.g. lithium phosphorus oxynitride or LIPON), and polymers (PEO).

The anode 110 is composed of the anode glass fiber scaffold 112 impregnated with anode active material 114 such as lithium metal or alloys including alloys of Si, Sn, Al, Ge, Pb, Bi, and Sb or other lithium compounds; and intercalation host materials, such as a carbon-based material. As illustrated in FIG. 1, the anode 110 has a layer 116 of anode active material 114 formed without the anode glass fiber scaffold 112. This layer 116 may be formed as an effect of the manufacturing process and is not a required layer.

The cathode 102 is composed of the cathode glass fiber scaffold 104 impregnated with the cathode active material 106. The cathode active material 104 comprises one or more electrochemically active cathode materials known for use in the solid-state battery, such as lithium-containing oxide (e.g., lithium cobalt oxide ($LiCoO_2$), lithium manganese oxide ($LiMnO_2$), lithium nickel manganese cobalt oxide (LiNMC), lithium vanadium oxide ($LiVO_2$), lithium chromium oxide ($LiCrO_2$), lithium nickel oxide ($LiNiO_2$), lithium nickel cobalt aluminum oxide ($LiNiCoAlO_2$), and other transition metal oxides, or lithium iron phosphate ($LiFePO_4$)) and other similar materials. The cathode active material 106 can also include one or both of a carbon material for electron conductivity and solid-state electrolyte. As a non-limiting example, the cathode active material 106 can be a mixture of carbon, Li-NMC and a solid-state electrolyte.

Figure 2:
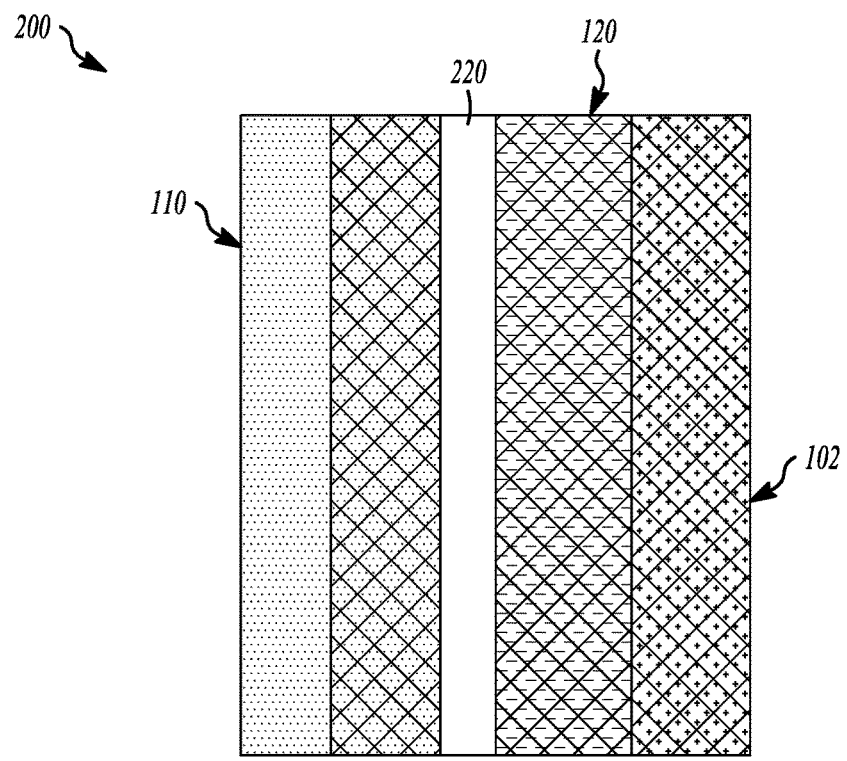
FIG. 2 is a cross-sectional view of an aspect of the embodiment of the solid-state battery cell of FIG. 1.

FIG. 2 illustrates another aspect of the solid-state battery cell of FIG. 1. In FIG. 2, the solid-state battery cell 200 has the same elements as the solid-state battery cell 100 of FIG. 1, except that a second electrolyte layer 220 is formed between the first electrolyte layer 120 and the anode 110, the second electrolyte layer 220 consisting of a second solid-state electrolyte. The first solid-state electrolyte 124 can be the same solid-state electrolyte material as the second solid-state electrolyte. The first solid-state electrolyte 124 can be a different solid-state electrolyte material than the second solid-state electrolyte. For example, the second solid-state electrolyte may be of a solid-state electrolyte material that is a better ion conductor than the first solid-state electrolyte.

Figure 3:
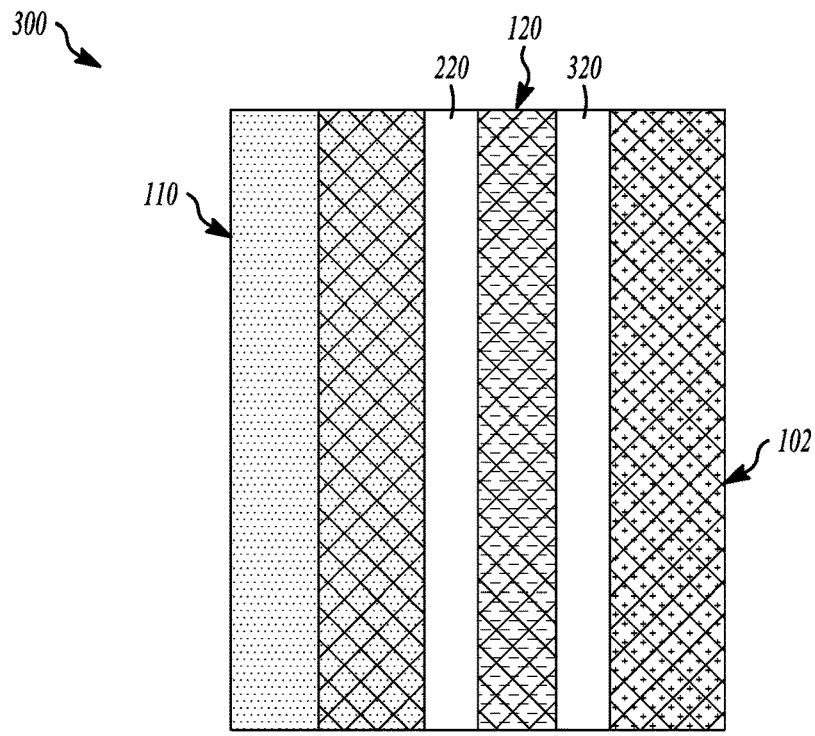
FIG. 3 is a cross-sectional view of an aspect of the embodiment of the solid-state battery cell of FIG. 2.

FIG. 3 illustrates another aspect of the solid-state battery cell of FIG. 2. In FIG. 3, the solid-state battery cell 300 has the same elements as the solid-state battery cell 200 of FIG. 2, except that a third electrolyte layer 320 is formed between the first electrolyte layer 120 and the cathode 102, the third electrolyte layer 320 also consisting of the second solid-state electrolyte. The first solid-state electrolyte 124 can be the same solid-state electrolyte material as the second solid-state electrolyte. The first solid-state electrolyte 124 can be a different solid-state electrolyte material than the second solid-state electrolyte. For example, the second solid-state electrolyte may be of a solid-state electrolyte material that is a better ion conductor than the first solid-state electrolyte.

Figure 4:
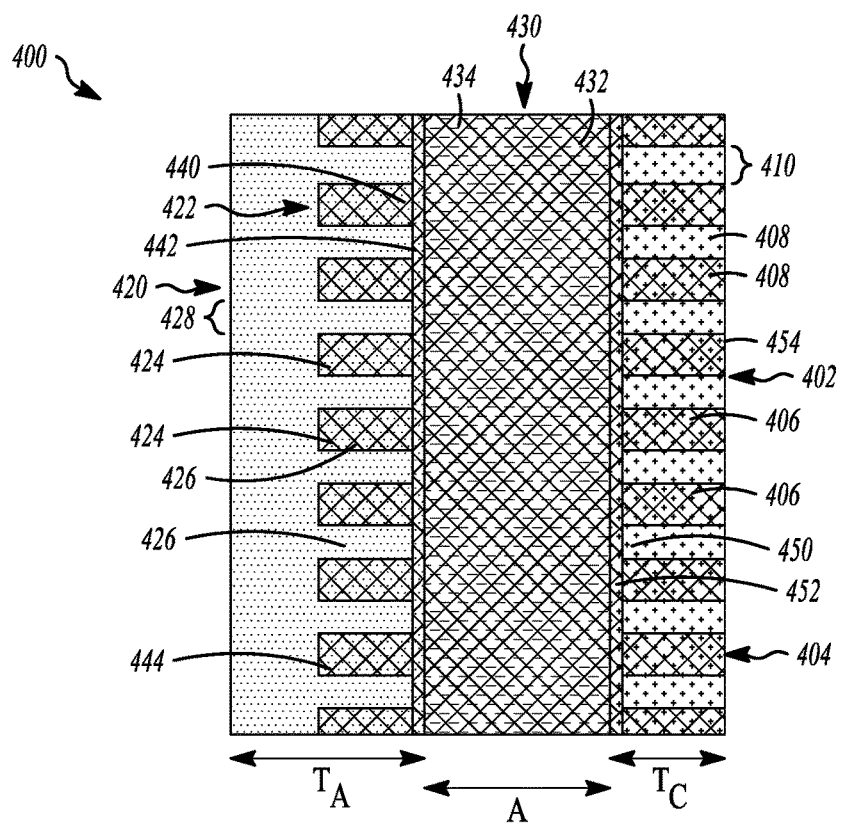
FIG. 4 is a cross-sectional view of another embodiment of a solid-state battery cell as disclosed herein.

FIG. 4 is another embodiment of a solid-state battery cell 400 as disclosed herein. The solid-state battery cell 400 includes a cathode 402 comprising a cathode glass fiber scaffold 404 formed of individual columns 406 of glass fiber extending in a thickness direction A of the cathode 402. The individual columns 406 are impregnated with the cathode active material 408 and space 410 between individual columns 406 is filled with the cathode active material 408. The glass fiber material and the active cathode material is as previously described. An anode 420 comprises an anode glass fiber scaffold 422 formed of individual columns 424 of glass fiber extending in the thickness direction A, the individual columns 424 impregnated with the anode active material 426 of lithium metal or the lithium metal alloy. Space 428 between individual columns 424 is filled with the anode active material 426. A first electrolyte layer 430 comprises an electrolyte glass fiber scaffold 432 impregnated with a first solid-state electrolyte 434, the electrolyte layer 430 positioned between the cathode 402 and the anode 420. The electrolyte glass fiber scaffold 432 extends throughout the first electrolyte layer 430.

Providing the anode glass fiber scaffold 422 and the cathode glass fiber scaffold 404 as columns rather than continuous throughout the respective anode and cathode provides for areas of lower resistance along the surface area of the electrodes. The electrolyte glass fiber scaffold 432 provides mechanical strength to the cell. The columns 424 of the anode glass fiber scaffold 420 can be connected with glass fiber at an electrolyte-facing end 440, providing a connected layer 442 that provides support to the columns 424 during manufacture and can also add to the mechanical robustness of the cell. The columns 406 of the cathode glass fiber scaffold 404 can be connected with glass fiber at an electrolyte-facing end 450, providing a connected layer 452 that provides support to the columns 406 during manufacture and can also add to the mechanical robustness of the cell.

The columns 424 of the anode glass fiber scaffold 420 can be uniform in cross-section along the entire column 424 or can be tapered from the electrolyte-facing end 440 to a distal end 444. Columns 424 can be of any cross-sectional shape, such as circular or square. The columns 406 of the cathode glass fiber scaffold 404 can be uniform in cross-section along the entire column 406 or can be tapered from the electrolyte-facing end 450 to a distal end 454. Columns 406 can be of any cross-sectional shape, such as circular or square.

The columns 424 of the anode glass fiber scaffold 420 can extend throughout the thickness TA of the anode 420 or can extend through a majority of the thickness TA but less than the entire thickness TA of the anode 420. The columns 406 of the cathode glass fiber scaffold 404 can extend throughout the thickness TC of the cathode 402 or can extend through a majority of the thickness TC but less than the entire thickness TC of the cathode 402.

Figure 5:
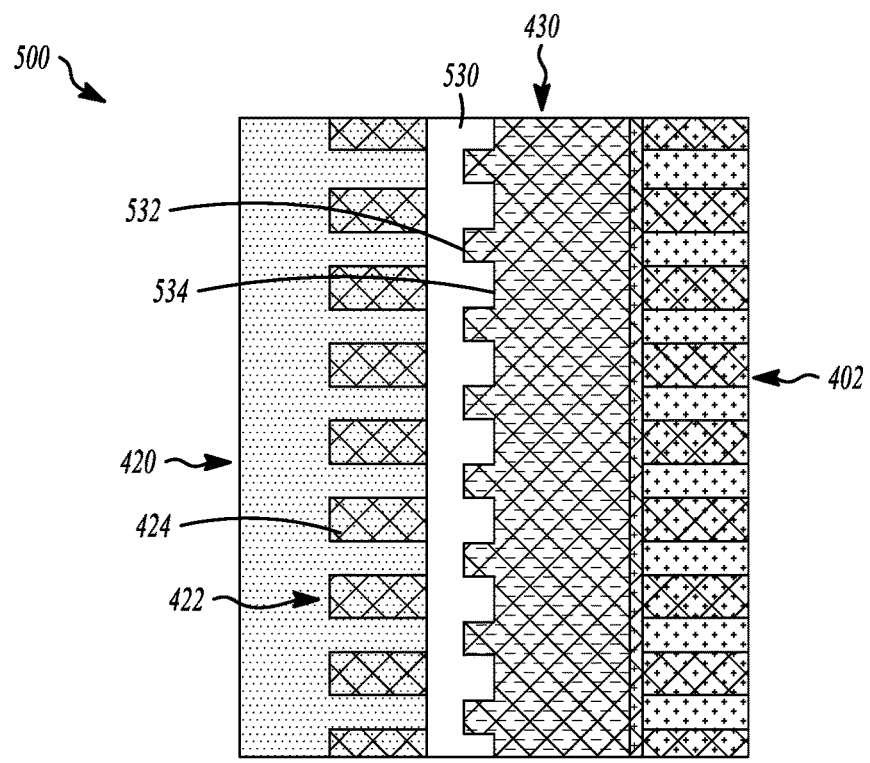
FIG. 5 is a cross-sectional view of an aspect of the embodiment of the solid-state battery cell of FIG. 4.

FIG. 5 illustrates an aspect of the solid-state battery cell 400 of FIG. 4. The solid-state battery cell 500 of FIG. 5 has the same elements of that of the solid-state battery cell 400 of FIG. 4, with the addition of a second electrolyte layer 530. The second electrolyte layer 530 is formed between the first electrolyte layer 430 and the anode 420, the second electrolyte layer 530 consisting of a second solid-state electrolyte. The first solid-state electrolyte 434 can be the same solid-state electrolyte material as the second solid-state electrolyte. The first solid-state electrolyte 434 can be a different solid-state electrolyte material than the second solid-state electrolyte. For example, the second solid-state electrolyte may be of a solid-state electrolyte material that is a better ion conductor than the first solid-state electrolyte.

The second electrolyte layer 530 can be of uniform thickness along the surface area of the layer, as illustrated in FIG. 2, or can have an alternating step pattern as illustrated in FIG. 5, with areas of a first thickness 532 alternating with areas of a second thickness 534, the first thickness 532 being less than the second thickness 534. The areas of the second thickness 534 are aligned with the individual columns 424 of the anode glass fiber scaffold 422. This alternating step pattern and the alignment with the columns is done to make the resistance across a surface area of the electrode more uniform.

Figure 6:
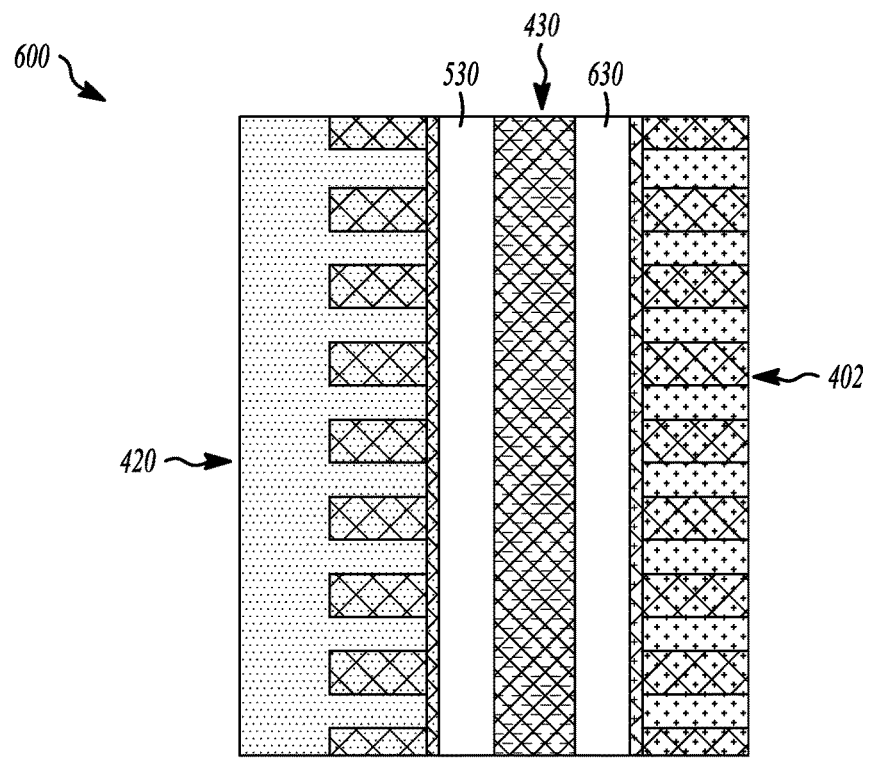
FIG. 6 is a cross-sectional view of an aspect of the embodiment of the solid-state battery cell of FIG. 5.

FIG. 6 illustrates another aspect of the solid-state battery cell of FIG. 5. In FIG. 6, the solid-state battery cell 600 has the same elements as the solid-state battery cell 500 of FIG. 5, except that a third electrolyte layer 630 is formed between the first electrolyte layer 430 and the cathode 402, the third electrolyte layer 630 also consisting of the second solid-state electrolyte. The first solid-state electrolyte 434 can be the same solid-state electrolyte material as the second solid-state electrolyte. The first solid-state electrolyte 434 can be a different solid-state electrolyte material than the second solid-state electrolyte. For example, the second solid-state electrolyte may be of a solid-state electrolyte material that is a better ion conductor than the first solid-state electrolyte. As illustrated in FIG. 6, both the second electrolyte layer 530 and the third electrolyte layer 630 can be of uniform thickness along the surface area are of the electrodes. Alternatively, one or both of the second electrolyte layer 530 and the third electrolyte layer 630 can have an alternating step pattern as illustrated in FIG. 5.

As a non-limiting example, the embodiments herein can be made in the following manner. An electrolyte glass fiber scaffold is loaded, or impregnated, with a solid-state electrolyte to form a first electrolyte layer. An anode glass fiber scaffold is attached to the first electrolyte layer by, for example, hot pressing followed by heat treatment at, for example 250° C. A cathode glass fiber scaffold is attached to the first electrolyte layer opposite the anode glass fiber scaffold by, for example, hot pressing. Anode active material is incorporated into the anode glass fiber scaffold and cathode active material is incorporated into the cathode glass fiber scaffold, such as by infiltration. Additional heat treatment can be performed to assist the lithium incorporation. Additional electrolyte layers are added prior to attaching the anode and/or cathode glass fiber scaffolds. The scaffolds with columns can be formed by laser cutting, as a non-limiting example. Other methods of manufacture known to those skilled in the art are contemplated herein.

The embodiments of the solid-state battery cells disclosed herein may be configured, among other parts, with a thin metal cathode current collector, such as, for instance, 10 μm aluminum foil (or no such current collector if the cathode is conductive enough along its outside surface to which the positive terminal may be connected). The elements of the solid-state battery cell may be, for example, packaged using a thin-film encapsulation of about 3 μm in thickness. A solid-state battery can have one or more solid-state battery cells.

Unless defined otherwise, all technical and scientific terms used herein have the same meanings as commonly understood by one of ordinary skill in the art to which this disclosure belongs. Preferred methods, techniques, devices and materials are described although any methods, techniques, devices, or materials similar or equivalent to those described may be used in the practice or testing of the present disclosure. Structures described herein are to be understood also to refer to functional equivalents of such structures.

It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid-state battery cell, comprising:
    a cathode comprising a cathode glass fiber scaffold impregnated with cathode active material;
    an anode comprising an anode glass fiber scaffold impregnated with lithium metal or a lithium metal alloy; and
    a first electrolyte layer comprising an electrolyte glass fiber scaffold impregnated with a first solid-state electrolyte, the electrolyte layer positioned between the cathode and the anode and the electrolyte glass fiber scaffold extending throughout the first electrolyte layer, wherein one or both of the cathode glass fiber scaffold and the anode glass fiber scaffold is formed from individual columns of glass fiber extending in a thickness direction of the battery cell, the individual columns impregnated with a respective active material and space between individual columns filled with the respective active material.

2. The solid-state battery cell of claim 1, wherein the individual columns of glass fiber extend through at least a majority of a thickness of the cathode.

3. The solid-state battery cell of claim 1, wherein the individual columns of glass fiber extend through at least a majority of a thickness of the anode.

4. The solid-state battery cell of claim 1, wherein the cathode active material is a nickel-manganese-cobalt based composite material.

5. The solid-state battery cell of claim 1, wherein the electrolyte glass fiber scaffold, the cathode glass fiber scaffold and the anode glass fiber scaffold each has a porosity of between 50% and 70%.

6. The solid-state battery cell of claim 1, further comprising:
a second electrolyte layer formed between the first electrolyte layer and the anode, the second electrolyte layer consisting of a second solid-state electrolyte.

7. The solid-state battery cell of claim 6, wherein the second solid-state electrolyte is different from the first solid-state electrolyte.

8. The solid-state battery cell of claim 6, wherein the second electrolyte layer has an alternating step pattern having areas of a first thickness alternating with areas of a second thickness, the first thickness being less than the second thickness.

9. The solid-state battery cell of claim 8, wherein the anode glass fiber scaffold is formed from individual columns of glass fiber extending in a thickness direction of the anode, the individual columns impregnated with lithium metal or the lithium metal alloy and space between individual columns filled with the lithium metal or the lithium metal alloy, and
the areas of the second thickness are aligned with the individual columns of glass fiber.

10. The solid-state battery cell of claim 6, further comprising:
a third electrolyte layer formed between the first electrolyte layer and the cathode, the third electrolyte layer consisting of the second solid-state electrolyte.

11. A solid-state battery cell, comprising:
a cathode comprising a cathode glass fiber scaffold is formed from individual columns of glass fiber extending in a thickness direction of the cathode, the individual columns impregnated with cathode active material and space between individual columns filled with the cathode active material;
an anode comprising an anode glass fiber scaffold formed from individual columns of glass fiber extending in a thickness direction of the anode, the individual columns impregnated with lithium metal or a lithium metal alloy and space between individual columns filled with the lithium metal or the lithium metal alloy; and
a first electrolyte layer comprising an electrolyte glass fiber scaffold impregnated with a first solid-state electrolyte, the electrolyte layer positioned between the cathode and the anode and the electrolyte glass fiber scaffold extending throughout the first electrolyte layer.

12. The solid-state battery cell of claim 11, further comprising:
a second electrolyte layer formed between the first electrolyte layer and the anode, the second electrolyte layer consisting of a second solid-state electrolyte.

13. The solid-state battery cell of claim 12, wherein the second solid-state electrolyte is different from the first solid-state electrolyte.

14. The solid-state battery cell of claim 12, wherein the second electrolyte layer has an alternating step pattern having areas of a first thickness alternating with areas of a second thickness, the first thickness being less than the second thickness, and
the areas of the second thickness are aligned with the individual columns of glass fiber of the anode and the individual columns of glass fiber of the cathode.

15. A solid-state battery cell, comprising:
a cathode comprising a cathode glass fiber scaffold impregnated with cathode active material;
an anode comprising an anode glass fiber scaffold impregnated with lithium metal or a lithium metal alloy, wherein one or both of the cathode glass fiber scaffold and the anode glass fiber scaffold is formed from individual columns of glass fiber extending in a thickness direction of the battery cell, the individual columns impregnated with a respective active material and space between individual columns filled with the respective active material;
a first electrolyte layer comprising an electrolyte glass fiber scaffold impregnated with a first solid-state electrolyte, the electrolyte layer positioned between the cathode and the anode and the electrolyte glass fiber scaffold extending throughout the first electrolyte layer;
a second electrolyte layer formed between the first electrolyte layer and the anode, the second electrolyte layer consisting of a second solid-state electrolyte; and
a third electrolyte layer formed between the first electrolyte layer and the cathode, the third electrolyte layer consisting of the second solid-state electrolyte.

16. The solid-state battery cell of claim 15, wherein the first solid-state electrolyte is different from the second solid-state electrolyte.

17. The solid-state battery cell of claim 15, wherein the cathode active material is a nickel-manganese-cobalt based composite material.

18. The solid-state battery cell of claim 15, wherein the electrolyte glass fiber scaffold, the cathode glass fiber scaffold and the anode glass fiber scaffold each has a porosity of between 50% and 70%.

* * * * *